July 31, 1956

T. A. GREEN 2,757,053

PRESSURE TIGHT BEARING

Filed Oct. 28, 1953

INVENTOR.
THOMAS A. GREEN
BY
*Raymond W. Jenkins*
ATTORNEY

United States Patent Office 2,757,053
Patented July 31, 1956

2,757,053
PRESSURE TIGHT BEARING

Thomas A. Green, Willoughby, Ohio, assignor to Bailey Meter Company, a corporation of Delaware Application October 28, 1953, Serial No. 388,829

1 Claim. (Cl. 308—187.1)

The present invention relates to a pressure tight bearing and thrust bearing assembly, particularly for use in meters, pressure gages, and the like; where the fluid pressure within the casing, in the wall of which the pressure tight bearing is formed is greater than that of the atmosphere as, for example, in the case of a differential pressure gage where the pressure operated device is inside a fluid tight casing, while the indicating or recording mechanism is outside, thus necessitating the passage of a shaft, spindle or equivalent translating device through the wall of the casing.

In many such meters or instruments, the pressure differentials available for imparting motion to the spindle are very small compared to the static pressure within the casing, against which it is necessary to seal. It is, therefore, essential that the friction or opposition to the movement of the spindle in the bearing be reduced to the greatest possible extent.

Many types of bearings have been utilized and some have been satisfactory in connection with static pressures, for example, up to 3000 pounds per square inch within the casing. In this regard, such a pressure tight bearing is disclosed in Barnes Patent 2,042,166. However, the present day problems call for the metering or measuring of pressures where the static pressure within the meter casing may be up to 6000 p. s. i., and under these conditions, it is extremely difficult, if not impossible, with prior bearings to maintain a pressure tight bearing having a minimum of frictional resistance to the movement of the spindle passing through the bearing.

Additionally, it is advantageous where sealing a meter casing for pressures up to 6000 p. s. i. to have only a single spindle opening to the atmosphere from the casing and in this regard a bearing is provided for the other end of the spindle within the casing. However, such construction requires a thrust bearing to restrain the spindle from moving outwardly from the chamber, due to unbalance of forces caused by the pressure within the chamber.

In Barnes Patent 2,224,627 a thrust bearing is shown, but it is of the type that necessitates additional structure outside the casing. In the present invention, I utilize a thrust bearing that is closely associated with the pressure tight bearing and integral with the spindle. This thrust bearing must withstand a pressure equal to the area of the spindle times the pressure in pounds per square inch.

Thus, a particular object of my invention is to provide an improved pressure tight bearing to seal a pressure in the order of 6000 p. s. i. within a meter casing and yet allow for rotation of a spindle that is actuated by minute forces in the order of 100 inches of water, for example.

Another object of my invention is to provide a pressure tight bearing assembly and a thrust bearing assembly at or near the end of the meter spindle extending outside the casing, and the other end of the spindle being supported by a bearing within the casing.

I illustrate and describe, as a preferred embodiment, the use of a pressure tight bearing in connection with a fluid rate of flow meter having a casing within which the meter parts are subjected to a static pressure which may approach the order of 6000 p. s. i., and which are positioned by pressure differentials of 100 inches of water or less, for imparting angular rotation to a spindle extending through the wall casing and which carries exteriorly an indicating pointer or recording pen, the other end of the spindle being supported in an internal bearing assembly.

Figure 1:
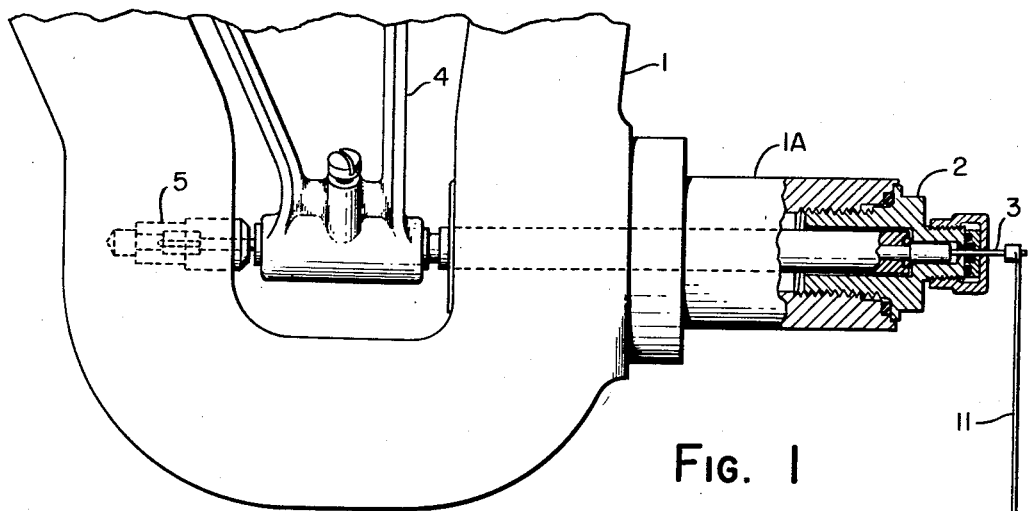
Fig. 1 is a plan view, partially in section, of a part of a fluid meter embodying the invention.

I have shown in Fig. 1 my invention as applied to a flow meter, a portion of which is shown in the form of casing 1, with an integral extension member 1A. Into extension member 1A is threaded a support member 2. A rear bearing assembly 5 is located within meter casing 1.

Spindle 3 extends from bearing 5 through casing 1 and extension member 1A to the exterior of support member 2. The spindle 3 is adapted to rotate through a total angular movement of less than 90°, by means of a pressure receiving device through the agency of an arm or lever 4 attached to spindle 3. Support member 2 is provided with an opening slightly larger than the spindle so as to keep friction to a minimum.

Figure 2:
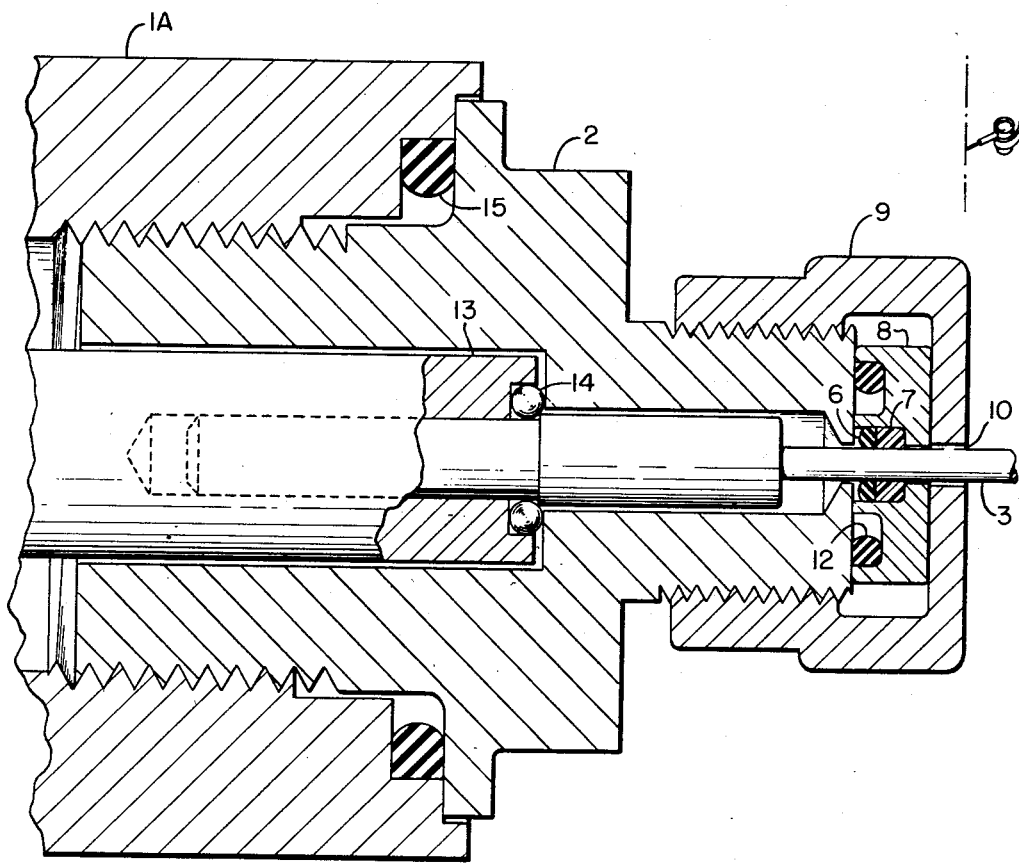
Fig. 2 is an enlarged sectional view showing a part of Fig. 1 embodying the invention.

In Fig. 2 the pressure tight bearing structure and thrust bearing are shown in an enlarged fashion, where it can be clearly seen that the fully protruding end of spindle 3 moves in a pressure tight bearing assembly 6, 7 and 8, while the other end of the spindle moves in bearing 5.

The pressure tight bearing assembly consists of a metallic follower 8 provided with an aperture slightly larger than the spindle for the spindle 3 to pass through, and with a circular concentric recess to contain O-ring 6 and a relatively thicker back-up washer 7, and provided with an additional concentric recess to house O-ring 12. An O-ring is an endless ring of resilient compressible material such as rubber, either natural or synthetic or a combination of the two. Said O-ring 6 is molded so as to have a substantially circular cross-section.

Metallic follower 8 is constructed so that it bears against support member 2 when the retaining cap 9 is threaded onto member 2. Cap 9 is also provided with an aperture which allows the spindle 3 to pass without frictional contact.

The pressure tight bearing assembly itself depends upon the cooperation of washer 7 with spindle 3, and the action of O-ring 6 against the adjacent flat surface of washer 7 and spindle 3 upon the application of the static pressure from within the casing 1.

The plastic washer 7 fits snugly about spindle 3 as shown in Fig. 2, and suitable material for such washer 7 is a fluorocarbon plastic such as polytetrafluorethylene known as 'Taflon" manufactured by the E. I. du Pont Company. This plastic material has very little surface friction and is self lubricating. The plastic washer 7 acts as a back-up washer for O-ring 6.

I determined that when using an O-ring alone as a pressure tight bearing about spindle 3 that pressures of over 3000 p. s. i. tended to extrude the O-ring along the spindle into the space between follower 8 and the spindle thus increasing the friction to a point where the spindle could no longer be rotated in response to the forces acting on lever 4.

To prevent this extrusion of O-ring 6, I found it necessary to utilize a metallic follower 8 provided with an aperture through which the spindle 3 could pass, and also provided with a concentric recess which would contain the O-ring 6 and at the same time contain fluorocarbon washer 7 in close fit relation. The pressure from within casing 1 acting on such assembly 6, 7, 8 forces the O-ring 6 against plastic washer 7, but as the washer 7 is closely fitted about spindle 3, the O-ring 6 no longer extrudes along the spindle, but acts entirely against the thicker and flat coextensive washer 7 and the spindle surface to prevent any pressure from within the casing from escaping out along the spindle. The spindle 3 is buffed to a high polish where it contacts O-ring 6 to reduce the friction at that point. As mentioned above the metallic follower 8 is held against support member 2 by a threaded cap 9 which is pulled down to metallic contact with member 2.

In the structure disclosed in the drawing, it has been determined that a thrust of at least 30 pounds is exerted on spindle 3 when there is a static pressure of 6000 p. s. i. in the casing 1. The thrust acts on spindle 3 to move it in a direction toward the pressure tight bearing assembly. To prevent this thrust force from moving the spindle 3, a ball bearing assembly 14 is shown positioned between a portion 13 of the spindle 3 and support member 2. The ball bearings 14 are utilized, of course, to reduce the friction while resisting the thrust force as the spindle rotates.

Additional sealing means have been provided by O-ring 15 for assuring a pressure tight seal between extension member 1A and support member 2, and O-ring 12 provides a sealing means between support member 2 and metallic follower 8.

Thus it is seen that a pressure tight bearing and end thrust assembly has been provided for sealing high pressures within a casing and which at the same time allows for angular motion of a spindle extending from the casing to the atmosphere so that the spindle is responsive to extremely minute forces acting on lever 4.

It will be understood that I have illustrated and described only one preferred form of my invention and the same may be accomplished with other materials and in other shapes or ways, and that I am to be limited only as to the claim in view of the prior art.

What I claim as new, and desire to secure by Letters Patent of the United States, is:

A pressure-tight bearing and thrust assembly for an angularly movable spindle extending to the atmosphere through the wall of a casing within which is a pressure greater than that of the atmosphere, including, an extenmember from the casing, a support member threaded into the extension member and sealed to the extension member with a first O-ring form of packing and providing a flat external surface through which an aperture provides access to the casing interior, a shaft extending through the flat surface of the support member and connected to the mechanism within the casing to transmit its motion externally of the casing, a follower body arranged about the shaft to provide two concentric recesses about the shaft to the flat surface of the support member, a flat washer of fluorocarbon material closely fitting the spindle and in the first of the concentric recesses about the shaft, a second O-ring form of resilient packing of the same outside diameter as the washer about the spindle and arranged to move against the washer from pressure within the casing, a third O-ring form of resilient packing in the second and outer concentric recess about the shaft to seal between the follower body and the flat surface of the support member, a ball-bearing structure internal of the casing and between the shaft and support member in order to receive the thrust force to which the shaft is subjected, and a cap structure threaded to the support member to capture the follower against the external flat surface of the support member.

References Cited in the file of this patent

UNITED STATES PATENTS

| | | |
|---|---|---|
| 1,977,030 | Wilson | Oct. 16, 1934 |
| 2,042,166 | Barnes | May 26, 1936 |
| 2,494,598 | Waring | Jan. 17, 1950 |
| 2,615,763 | Wolford | Oct. 28, 1952 |
| 2,666,659 | Audemar | Jan. 19, 1954 |